United States Patent [19]

Mashuda

[11] Patent Number: 5,281,074
[45] Date of Patent: Jan. 25, 1994

[54] TRUCK BODY

[76] Inventor: David Mashuda, 442 Zehner School Rd., Zelienople, Pa. 16063

[21] Appl. No.: 958,081

[22] Filed: Oct. 8, 1992

[51] Int. Cl.⁵ ............................................... B60P 1/00
[52] U.S. Cl. .................................... 414/517; 414/511; 414/525.2; 414/914; 414/408; 298/23 MD; 280/756; 296/101
[58] Field of Search .............. 414/509, 510, 511, 512, 414/513, 514, 515, 516, 517, 518, 521, 519, 520, 525.1, 525.2, 525.3, 525.4, 525.55, 526.6, 404, 405, 406, 407, 408, 409, 914; 298/23 MD; 296/101, 3; 280/756; 100/218, 227

[56] References Cited

U.S. PATENT DOCUMENTS

| | | |
|---|---|---|
| 1,927,653 | 9/1933 | Wehr . |
| 2,047,602 | 7/1936 | Tomlinson . |
| 2,179,726 | 11/1939 | Lewis et al. . |
| 2,318,886 | 5/1943 | Paiement . |
| 2,541,538 | 2/1951 | Newell . |
| 2,800,234 | 7/1957 | Herpich et al. . |
| 3,021,968 | 2/1962 | Myers . |
| 3,240,370 | 3/1966 | Sadler . |
| 3,273,728 | 9/1966 | Kelso . |
| 3,768,672 | 10/1973 | Grooss .................. 414/517 |
| 3,833,255 | 9/1974 | Logue ................... 296/101 |
| 4,201,508 | 5/1980 | Brisson ............... 414/525 R |
| 4,552,500 | 11/1985 | Ghibaudo et al. ........ 414/408 |
| 4,715,767 | 12/1987 | Edelhoff et al. ........ 414/408 |
| 4,775,283 | 10/1988 | Krapp et al. .......... 414/492 |

FOREIGN PATENT DOCUMENTS

| | | | |
|---|---|---|---|
| 144142 | 9/1982 | Japan ..................... 296/101 |
| 1504123 | 8/1989 | U.S.S.R. ................ 414/511 |

Primary Examiner—Frank E. Werner
Attorney, Agent, or Firm—Webb, Burden, Ziesenheim & Webb

[57] ABSTRACT

A truck bed having a longitudinally movable bulkhead for ejecting material carried therein. A cab cover plate is pivotally attached to a carriage coupled to the bulkhead. A mechanism for pivoting the cab cover plate to remove the material carried thereon is also provided.

13 Claims, 4 Drawing Sheets

TRUCK BODY

BACKGROUND OF THE INVENTION

This invention relates to truck bodies with h cab forward of the truck bed wherein a bulkhead moves longitudinally from the forward to the rear end of the truck bed to eject material carried therein. This Material ejecting truck bodies which provide a movable bulkhead or pusher to empty the contents of the truck bed are well-known in the art. These truck body designs allow for emptying the contents of the truck bed with minimal additional space requirements, as opposed to the normal space required above the bed of the truck when utilizing a pivoted bed arrangement. However, the prior art has failed to provide effective means for removing material positioned on a cab cover plate The present invention attempts to overcome the drawbacks of the prior art.

SUMMARY OF THE INVENTION

The present invention provides a truck which includes a cab positioned in a forward portion of the truck and a truck bed for carrying material to be transported by the truck positioned in the rear. The truck bed includes a flow and a pair of spaced sidewalls attached to the floor extending longitudinally along the truck. Each sidewall has a first end adjacent the cab of the truck and a second end at a distal, discharge end of the truck. A movable bulkhead extends between the sidewalls. The bulkhead is movable along substantially the entire length of the sidewalls and truck bed for ejecting material from the truck bed. A piston assembly for moving the bulkhead is attached thereto. A movable carriage is attached to the bulkhead to be movable therewith. A cab cover plate supported by the carriage is pivotally attached to the carriage. A mechanism is provided for pivoting the cab cover plate for dumping material carried by the cab cover plate.

BRIEF DESCRIPTION OF THE DRAWINGS

These and other advantages of the present invention will become clarified in the description of the preferred embodiment in connection with the figures attached hereto, of which.

DESCRIPTION OF THE PREFERRED EMBODIMENT

Figure 1:
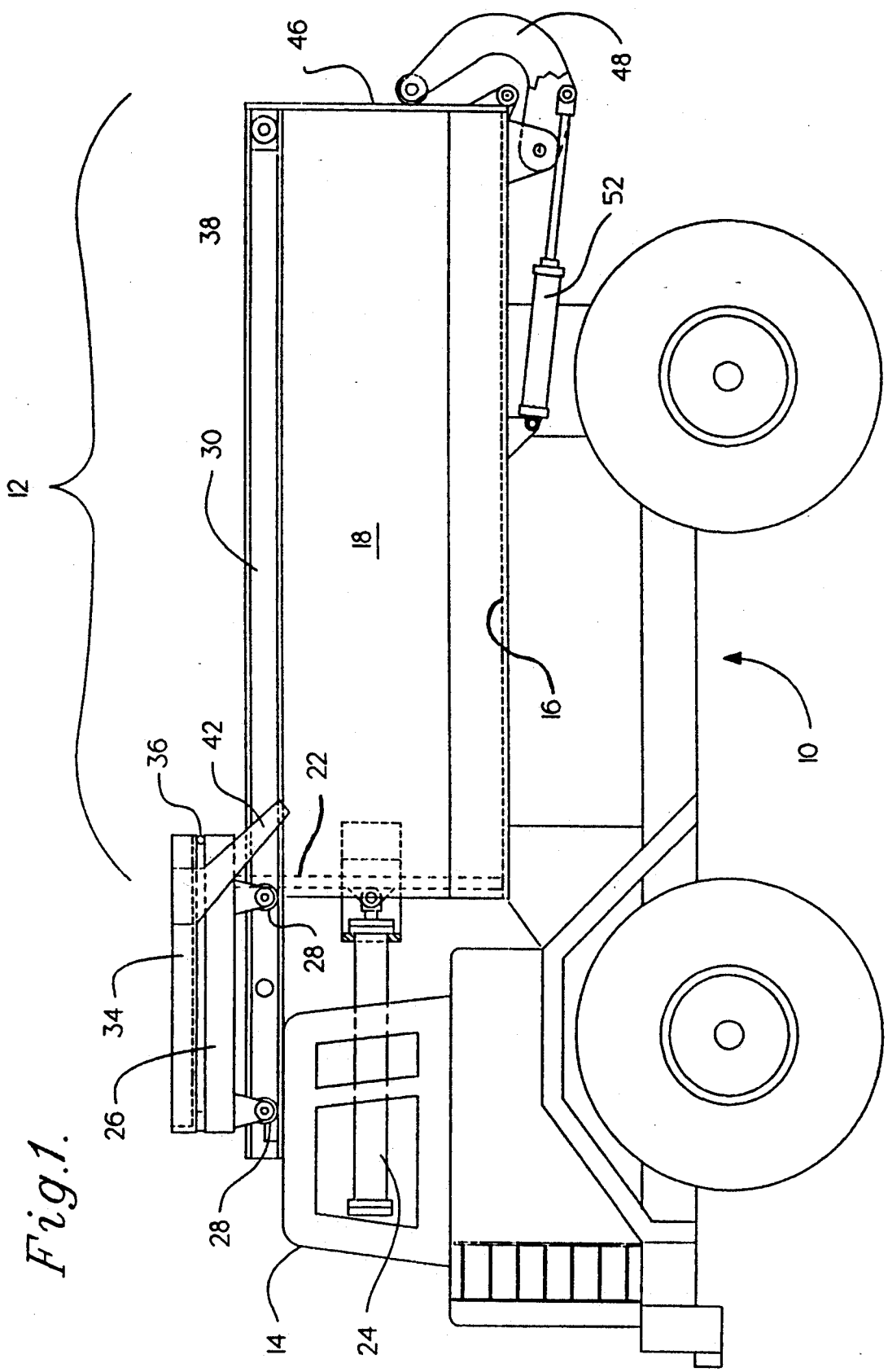
FIG. 1 shows a side view of a truck of the present invention.

FIG. 1 illustrates a truck 10 utilizing a truck bed 12 of the present invention. The truck 10 includes a cab 14 positioned in a forward portion of the truck. The truck bed 12 is for carrying material to be transported by the truck 10 and is positioned behind the cab 14 in a rearward portion of the truck 10. The truck bed 12 includes a floor 16 (see FIGS. 3 and 4) having a first end adjacent the cab 14 and a second end at a distal, discharge end of the truck 10. A pair of substantially parallel, spaced sidewalls 18 and 20 (see FIG. 3) are attached to the floor 16 and extend longitudinally along the truck 10. Each sidewall includes a first end adjacent the cab 14 and a second end adjacent a distal, discharge end of the truck 10.

A movable bulkhead 22 extending between the sidewalls 18 and 20 forms the forward end of the material carrying container of the truck bed 12. The bulkhead 22 is movable along substantially the entire length of the sidewalls 18 and 20 for ejecting material from the truck bed 12. A piston assembly 24 is coupled to the bulkhead 22 for moving the bulkhead 22 and ejecting the material. The piston assembly 24 is supported by a gantry 25 which extends between tracks 30 and 32 (see FIG. 3). However, the piston assembly 24 may be mounted to the truck 10 in any conventional manner.

Figure 3:
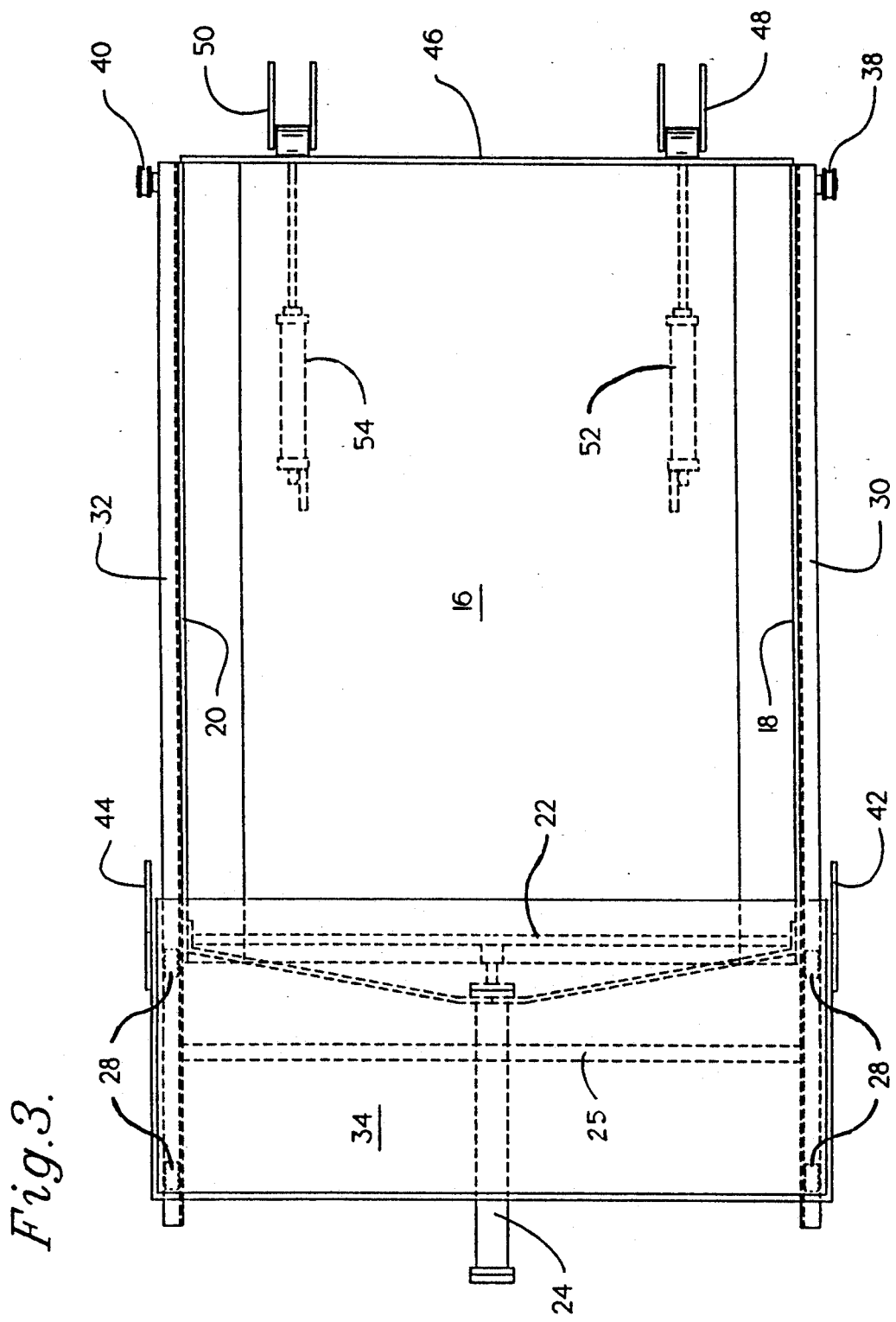
FIG. 3 is a top view of the truck bed and cab cover plate of FIG. 1 with the cab cover plate pivoting stops removed for clarity.
Figure 4:
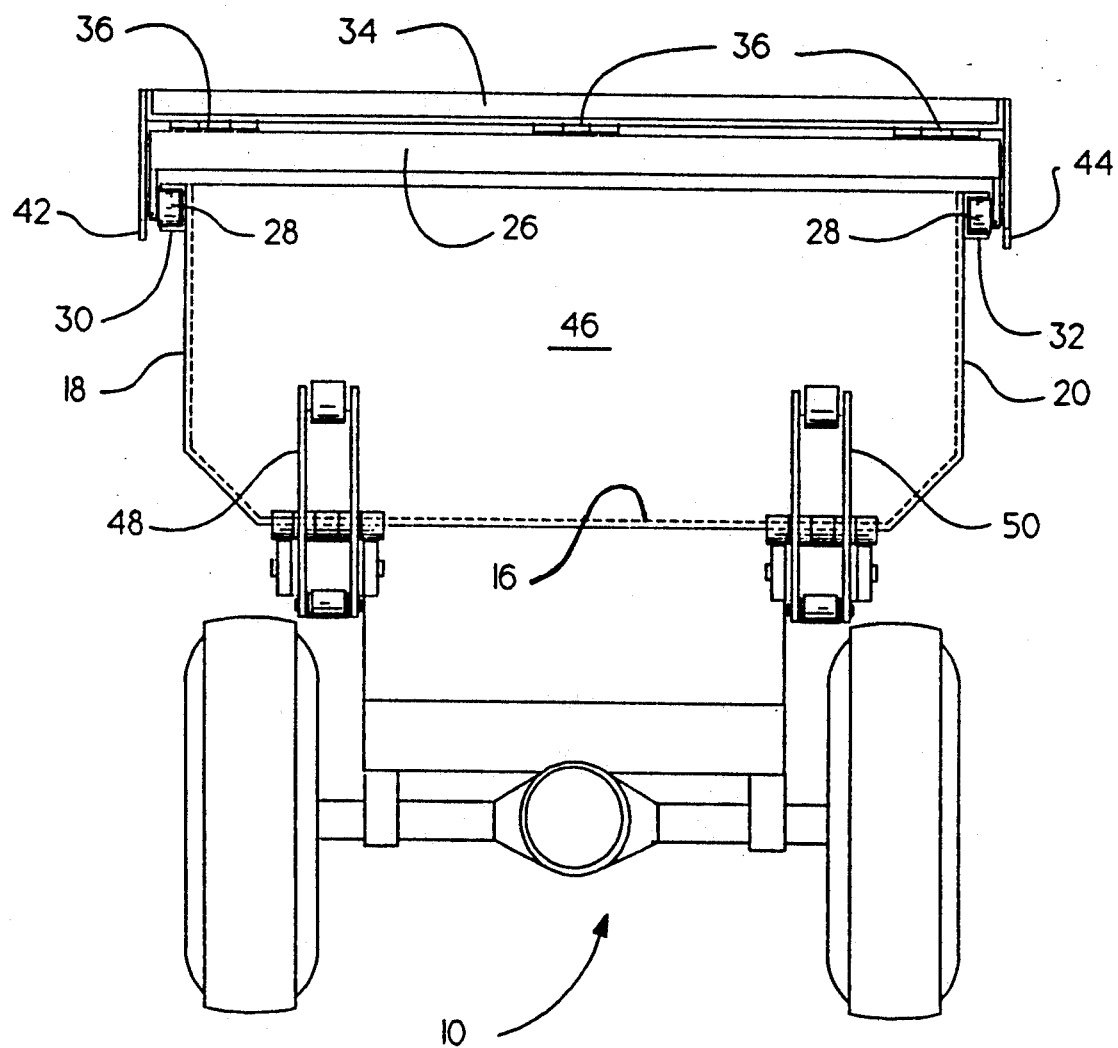
FIG. 4 is a rear view of the truck of FIG. 1.

Positioned above the sidewalls and attached to the bulkhead is a carriage 26. The carriage 26 is mounted for movement on rollers 28 which are positioned in a pair of tracks 30 and 32 (see FIG. 3) extending from the cab 14 to the distal end of the sidewalls 18 and 20, respectively. Each track 30 and 32 supports the rollers 28 which in turn support the carriage 26 which moves with the bulkhead 22. The carriage 26 pivotably supports a cab cover plate 34 in a substantially horizontal position. The cab cover plate 34 is pivotably attached to the carriage 26 through hinges 36 (as best shown in FIG. 4).

Figure 2:
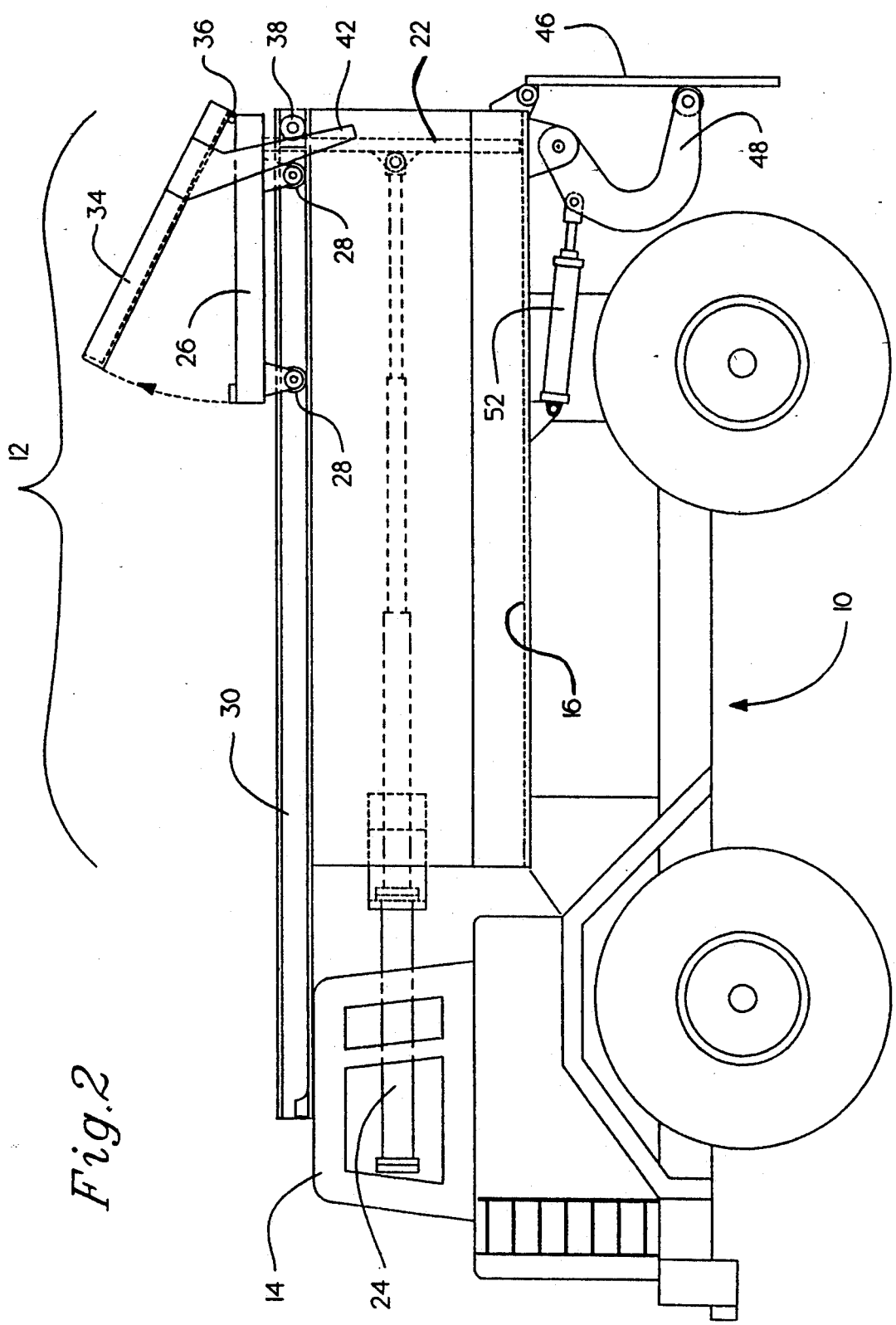
FIG. 2 shows a side view of the truck of FIG. 1 with the bulkhead and cab cover plate moved to the rear of the bed.

A mechanism is provided for pivoting the cab cover plate 34 as the bulkhead 22 reaches the distal, discharge end of the truck bed 12 (as shown in FIG. 2). A pair of stops 38 and 40 (see FIG. 3) are attached to the sidewalls 18 and 20, respectively, adjacent the distal end of the truck bed 12. A pair of camming lever arms 42 and 44 are attached to the cab cover plate 34 and cooperate with the pair of stops 38 and 40, respectively, to pivot the cab cover plate 34 into an elevated, discharge position as the bulkhead 22 moves to the distal, discharge end of the truck bed 12.

A gate 46 is pivotally attached to the floor 16 and extends between the sidewalls 18 and 20 at the distal end of the truck bed forming a rearward end of the material carrying container of the truck bed 12. As shown in FIG. 3, gate 46 is attached to a pair of gate arms 48 and 50 operated by a pair of pistons 52 and 54, respectively, for opening and closing the gate.

The operation of the truck bed 12 of the present invention is as follows. When material is being transported within the truck bed 12, the bulkhead 22 is positioned adjacent the first end of the truck bed 12 adjacent the cab 14. The carriage 26 is in a position such that it overlays the cab 14 as does the supported cab cover plate 34 in a substantially horizontal position (as shown in FIG. 1). Material to be carried is loaded on floor 16 between the sidewalls 18 and 20, and as is often the case, material may be spilled during the loading procedure or otherwise deposited on top of the cab cover plate 34. During transportation, the gate 46 will normally be in an upward, closed position as shown in FIG. 1. To discharge the carried material, the gate 46 is lowered to an open position by actuating the pistons 52 and 54 to pivot the gate arms 48 and 50, respectively, and pivotally open the gate 46. The bulkhead 22 is moved by the piston assembly 24 toward the distal, discharge end of the truck bed 12. The carriage 26 and the cab cover plate 34 will follow the bulkhead 22 since the carriage 26 is attached to the bulkhead 22. As the bulkhead 22 approaches the distal end of the truck bed 12, the pair of camming lever arms 42 and 44 will engage with the pair of stops 38 and 40, respectively, provided on the sidewalls 18 and 20 such that continued movement of the bulkhead 22 will pivotally raise the cab cover plate 34 to a second elevated position discharging any material carried thereon (as shown in FIG. 2).

The present invention provides f or a quick, easy discharge of material and incorporates a design which removes material present on the cab cover plate 34. Material may be transported on the cab cover plate 34 or may be pushed onto the cab cover plate 34, as the bulkhead 22 moves toward the discharge end of the truck bed 12. In either case, the present arrangement provides for the discharge of such material.

It will be apparent to those of ordinary skill in the art that various modifications may be made to the present invention without departing from the spirit and scope thereof. Consequently, the Applicant's invention is to be limited only by the attached claims.

I claim:

1. A truck which includes a cab positioned in a forward portion of said truck, a truck bed for carrying material to be transpoeted by said truck, with said truck bed having a first end adjacent said cab and a second end at a distal end of said truck and a length between said first end and said second end, a bulkhead being movable along substantially said length of said truck bed for ejecting the material from said truck bed, a bulkhead moving means, and a movable carriage attached to said bulkhead and movable with said bulkhead; wherein the improvement comprises a cab cover plate pivotally supported by said carriage, and means to pivot said cab cover plate when said bulkhead is moved adjacent a second end of said sidewalls, wherein a pair of tracks extending from said cab to said second end of said sidewalls is provided where said pair of tracks carry rollers for supporting said carriage; and wherein said cab cover plate pivoting means includes a pair of stops provided in the sidewalls of said truck bed adjacent said second end of said truck bed and aligned with said pair of tracks, and a pair of camming arms attached to said cab cover plate cooperating with said stops to pivot said cab cover plate.

2. A truck comprising:
a cab positioned in a forward portion of said truck;
a truck bed for carrying material to be transported by said truck, said bed including a floor having a length and a pair of spaced sidewalls attached to said floor and extending longitudinally along said truck, each sidewall having a first end adjacent said cab and a second end at a distal end of said truck;
a bulkhead extending between said sidewalls, said bulkhead being movable along substantially said length of said floor and sidewalls or ejecting the material from said truck bed;
a means for moving said bulkhead coupled to said bulkhead;
a movable carriage attached to said bulkhead and movable with said bulkhead;
a cab cover plate supported by said carriage wherein said cab cover plate is pivotally attached to said carriage; and
means to pivot said cab cover plate when said bulkhead is moved adjacent said second end of said sidewalls, wherein a pair of tracks extending from said cab to a second end of said sidewalls is provided where said pair of tracks carry rollers for supporting said carriage; and wherein said cab cover plate pivoting means includes a pair of stops provided in said sidewalls adjacent said second end and aligned with said pair of tracks, and a pair of camming arms attached to said cab cover late cooperating with said stops to pivot said cab cover plate.

3. The truck of claim 2 wherein said cab cover plate is povitable between a substantially horizontal position and a second elevated position.

4. The truck of claim 2 wherein said carriage is movable from a position which overlays said cab when said bulkhead is adjacent said first end of said sidewalls.

5. The truck of claim 2 wherein said bulkhead moving mean comprises a piston assembly.

6. The truck of claim 2 further including a gate extending between said sidewalls at said second end and optionally attached to said floor.

7. The truck of claim 6 further including a means for pivoting said gate between a closed position and an open position.

8. The truck of claim 7 wherein said gate pivoting means includes a pair of pivotable gate arms attached to said gate and operated by a pair of pistons.

9. A truck bed for carrying material to be transported, said bed comprising:
a floor extending in a longitudinal direction and having a first end and a second end;
a pair of spaced sidewalls attached to said floor and extending along said longitudinal direction, each said sidewall having a first end and a second end and a length between said first and said second end;
a bulkhead extending between said sidewalls, said bulkhead being movable along substantially said length of said sidewalls or ejecting material from said truck bed;
a means for moving said bulkhead coupled to said bulkhead;
a movable carriage attached to said bulkhead and movable with said bulkhead;
a cover plate supported by said carriage wherein said cover plate is pivotally attached to said carriage; and
means to pivot said cover plate when said bulkhead is moved adjacent said second end of said sidewalls, wherein a pair of tracks extending the longitudinal length of said sidewalls is provided where said pair of tracks carry rollers for supporting said carriage; and wherein said cab cover plate pivoting means includes a pair of stops provided in said sidewalls adjacent said second end and aligned with said pair of tracks, and a pair of camming arms attached to said cab cover plate cooperating with said stops to pivot said cab cover plate.

10. The truck bed of claim 90 wherein said cover plate is pivotable between a substantially horizontal position and a second elevated position.

11. The truck of claim 9 wherein said carriage is movable from a position which extends beyond said first end of said floor when said bulkhead is adjacent said first end of said sidewalls.

12. The truck bed of claim 9 further including a gate extending between said sidewalls at said second end of said sidewalls and pivotably attached to said floor at said second end of said floor.

13. The truck bed of claim 12 further including a means for pivoting said gate between a closed position and an open position.

* * * * *

UNITED STATES PATENT AND TRADEMARK OFFICE
CERTIFICATE OF CORRECTION

PATENT NO. : 5,281,074
DATED : January 25, 1994
INVENTOR(S) : David Mashuda

It is certified that error appears in the above-indentified patent and that said Letters Patent is hereby corrected as shown below:

Column 1 Line 5 "h" should read --the--.

Column 1 Line 8 after "This" insert --invention is specifically related to material ejecting truck beds which include cab cover plates.--.

Column 1 Line 18 after "plate" insert --.--.

Column 1 Line 26 "flow" should read --floor--.

Column 3 Line 5 "f or" should read --for--.

Claim 2 Line 52 Column 3 "or" should read --for--.

Claim 2 Line 3 Column 4 "late" should read --plate--.

Claim 5 Line 13 Column 4 "mean" should read --means--.

Claim 6 Line 16 Column 4 "optionally" should read --pivotably--.

UNITED STATES PATENT AND TRADEMARK OFFICE
CERTIFICATE OF CORRECTION

PATENT NO. : 5,281,074
DATED : January 25, 1994
INVENTOR(S) : David Mashuda

It is certified that error appears in the above-indentified patent and that said Letters Patent is hereby corrected as shown below:

Claim 9 Line 33 Column 4 "or" should read --for--.

Claim 10 Line 53 Column 4 "90" should read --9--.

Claim 11 Line 56 Column 4 after "truck" insert --bed--.

Signed and Sealed this

Fifth Day of July, 1994

Attest:

BRUCE LEHMAN

Attesting Officer    Commissioner of Patents and Trademarks